(12) United States Patent  
Otsu et al.

(10) Patent No.: US 7,867,595 B2
(45) Date of Patent: Jan. 11, 2011

(54) OPTICAL INFORMATION RECORDING MEDIUM

(75) Inventors: Takeshi Otsu, Takasaki (JP); Akimasa Miyata, Takasaki (JP); Motomitsu Hagiwara, Takasaki (JP); Isao Matsuda, Takasaki (JP); Fumi Hara, Takasaki (JP); Shingo Kato, Takasaki (JP); Takuo Kodaira, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 497 days.

(21) Appl. No.: 11/940,258

(22) Filed: Nov. 14, 2007

(65) Prior Publication Data

US 2008/0118698 A1 May 22, 2008

(30) Foreign Application Priority Data

Nov. 15, 2006 (JP) ............................. 2006-308603

(51) Int. Cl.
*B32B 3/02* (2006.01)
(52) U.S. Cl. .................... 428/64.1; 428/64.4; 428/64.8; 430/270.14
(58) Field of Classification Search ........................ None
See application file for complete search history.

(56) References Cited

U.S. PATENT DOCUMENTS 6,967,048 B2 * 11/2005 Saito et al. ................. 428/64.1
7,005,174 B2 * 2/2006 Yamasaki et al. .......... 428/64.1

FOREIGN PATENT DOCUMENTS

JP 2003-36562 A 2/2003
JP 2003-45079 2/2003

* cited by examiner

*Primary Examiner*—Elizabeth Mulvaney
(74) *Attorney, Agent, or Firm*—Law Office of Katsuhiro Arai (57) ABSTRACT

An optical information recording medium is provided having a superior jitter property even when an organic substance is used for a recording layer. The optical information recording medium has a substrate having a penetrating hole in a central portion thereof and a spiral pre-groove provided in one surface of the substrate, a reflection layer provided on the surface of the substrate in which the pre-groove is provided, a recording layer which is provided on the reflection layer and which is composed of an organic substance including a dye, and a light transmissive cover layer provided on the recording layer. In the optical information recording medium, the cover layer has an elastic modulus of 40 MPa or less at 25° C. in an interface region facing the recording layer.

11 Claims, 4 Drawing Sheets

OPTICAL INFORMATION RECORDING MEDIUM

BACKGROUND OF THE INVENTION

1. Field of the Invention

The present invention relates to a next-generation optical information recording medium, and more particularly relates to a next-generation optical information recording medium, such as a Blu-ray Disc, using dye for a recording layer.

2. Description of the Related Art

As an information recording medium, an optical information recording medium, such as an optical disc, is about to rapidly become widespread. As the optical information recording medium as described above, for example, there may be mentioned a medium, such as a CD-R, in which a recording layer and a reflection layer are sequentially formed on a light transmissive resin substrate having a thickness of 1.2 mm and a diameter of 120 mm or 80 mm. In recent years, a higher information recording density has been required. Accordingly, a method for decreasing the wavelength of laser light and using an object lens having a higher NA (numerical aperture) has been conceived, and as a result, an optical information recording medium, such as a DVD±R, has been realized. In this DVD±R, in order to increase the permissible value of a tilt angle of the disc caused by a shorter wavelength and a higher NA, two light transmissive resin substrates having a thickness of 0.6 mm are adhered to each other with a reflection layer and a recording layer provided therebetween.

However, in recent years, in order to record high-definition image data, a higher information recording density has been required. Hence, an optical information recording medium has been proposed in which, as a Blu-ray Disc (BD-R), a reflection layer and a recording layer are formed on one surface of a resin substrate having a thickness of 1.1 mm and, on said one surface, a light transmissive cover layer having a thickness of 0.1 mm is provided.

As disclosed in Japanese Unexamined Patent Application Publication No. 2003-45079, the optical information recording medium as described above is formed to have a size equivalent to that of CD-R and/or DVD±R in which a reflection layer and a recording layer are sequentially formed on one surface of a resin substrate which has a thickness of 1.1 mm and which has a pre-groove provided in said one surface, and on the layers thus formed, a light transmissive resin-made cover layer having a thickness of 0.1 mm is formed. In addition, as disclosed in Japanese Unexamined Patent Application Publication No. 2003-36562, in order to protect a recording layer, a protective layer composed of a light transmissive inorganic material is provided between a cover layer and the recording layer in some cases.

The recording layer of the optical recording medium disclosed in the above patent documents is composed of an organic substance containing a dye, such as an azo-based dye or a cyanine-based dye, or an inorganic substance, such as Si, Cu, Sb, Te, or Ge, and pits are formed by laser irradiation for recording, so that data is recorded. However, when the same structure is used, in an optical information recording medium using an organic substance for a recording layer, there have been problems in that a jitter property and the degree of modulation are degraded. In the recording layer of an organic substance, when pits are formed by laser irradiation for recording, the amount of generated heat tends to increase. The heat thus generated may deform the substrate and the cover layer besides the recording layer. However, in order to ensure superior tracking properties, the substrate and the cover layer are generally formed from a material which is not likely to be deformed. As a result, the heat is liable to be accumulated in the recording layer, and hence it is believed that the jitter property is degraded thereby. In addition, in the recording layer of an organic substance, the change in light path length tends to decrease, and hence the degree of modulation tends to decrease. In order to increase the change in light path length, it may be conceived to increase the depth of the pre-groove. However, when the depth of the pre-groove is increased, the amount of dye for the recording layer is increased, and as a result, the amount of generated heat tends to increase. Hence, it is believed that the jitter property is further degraded.

SUMMARY OF THE INVENTION

In an embodiment, the present invention provides an optical information recording medium having a superior jitter property and a superior degree of modulation even when an organic substance is used for a recording layer.

According to an embodiment of the present invention, there is provided an optical information recording medium comprising: a substrate having a penetrating hole in a central portion thereof and a spiral pre-groove provided in one surface of the substrate; a reflection layer provided on the surface of the substrate in which the pre-groove is provided; a recording layer which is provided on the reflection layer and which is composed of an organic substance including a dye; and a light transmissive cover layer provided on the recording layer. In the optical information recording medium described above, the cover layer is formed from a curable resin and has an elastic modulus of 40 MPa or less at 25° C. in an interface region facing the recording layer.

The inventors of the present invention discovered that when recording is performed on the optical information recording medium, pits which are formed so as to intrude into the cover layer by plastic deformation of the interface region thereof can improve the jitter property since the amount of heat accumulated in the recording layer is decreased and can also improve the degree of modulation since the change in light path length is increased. According to an embodiment of the optical information recording medium of the present invention, the amount of heat generated in the recording layer during recording is absorbed by heat deformation of the cover layer, and after cooling, the deformed shape of the cover layer by the above intrusion is maintained; as a result, the jitter property is improved since the amount of heat accumulated in the recording layer is decreased, and in addition, the degree of modulation is improved since the change in light path length is increased.

In addition, according to another embodiment of the above optical information recording medium of the present invention, the cover layer preferably includes a first resin layer and a second resin layer having an elastic modulus lower than that of the first resin layer, and the above interface region is preferably composed of the second resin region.

By the use of the above cover layer of the optical information recording medium according to an embodiment of the present invention, in recording on the optical information recording medium, while the amount of heat accumulated in the recording layer is decreased by plastic deformation of the second resin layer, the durability of the cover layer may be ensured by the first resin layer.

In addition, in the optical information recording medium according to an embodiment of the present invention, the interface region on the pre-groove of the substrate preferably has a thickness of 19 to 30 µm.

By the interface region described above, the amount of deformation capable of decreasing the amount of heat accumulated in the recording layer so as to improve the jitter properties can be ensured.

In addition, the optical information recording medium according to an embodiment of the present invention may further comprise a protective layer made, for example, of a light transmissive inorganic material between the cover layer and the recording layer for protection thereof. An elastic-plastic deformation ratio of the protective layer described above is preferably 40% or less.

When the protective layer is provided between the recording layer and the cover layer, in order to obtain the effect of the present invention in an embodiment, the protective layer must be deformed following the deformation of the cover layer. According to the protective layer described above, since the plastic deformation of the protective layer is likely to occur as compared to the elastic deformation thereof, the protective layer is likely to be deformed following the deformation of the cover layer. As a result, the change ($\Delta C/N$) in C/N (carrier to noise ratio) can be suppressed to 1 dB or less, and hence the influence to the jitter property can be decreased.

According to an embodiment of the present invention, in the optical information recording medium using an organic substance containing a dye for a recording layer, a superior jitter property and a superior degree of modulation can be obtained.

For purposes of summarizing the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention. The drawings are oversimplified for illustrative purposes and are not to scale.

DETAILED DESCRIPTION OF THE PREFERRED EMBODIMENT

The present invention will be explained in detail with reference to preferred embodiments and drawings. However, the preferred embodiments and drawings are not intended to limit the present invention. In the following disclosure, the numerical numbers applied in embodiments can be modified by a range of at least ±50% in other embodiments, and the ranges applied in embodiments may include or exclude the endpoints.

Figure 1:
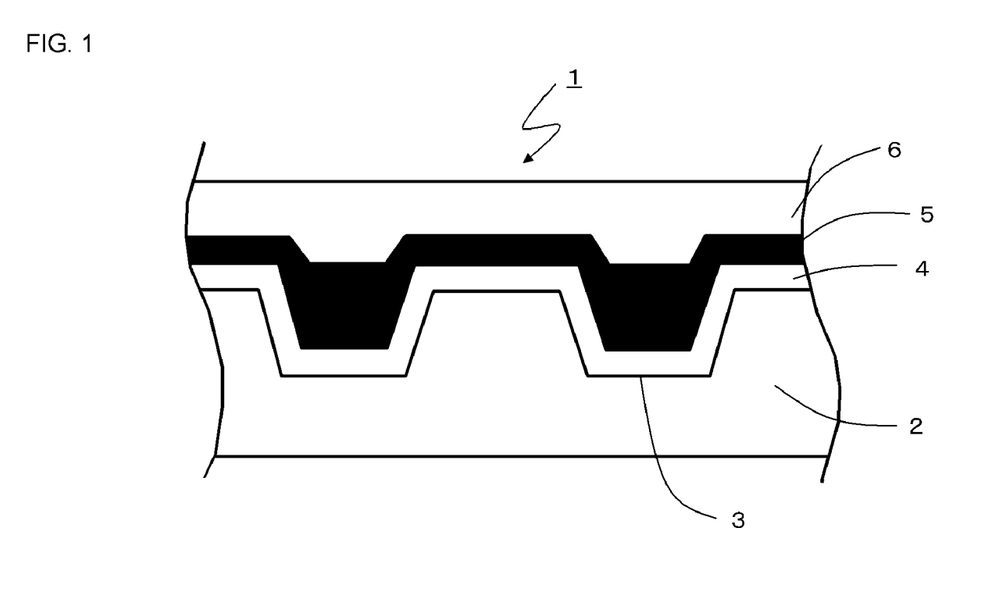
FIG. 1 is a schematic enlarged cross-sectional view of an optical information recording medium of a first embodiment according to an embodiment of the present invention.
Figure 2:
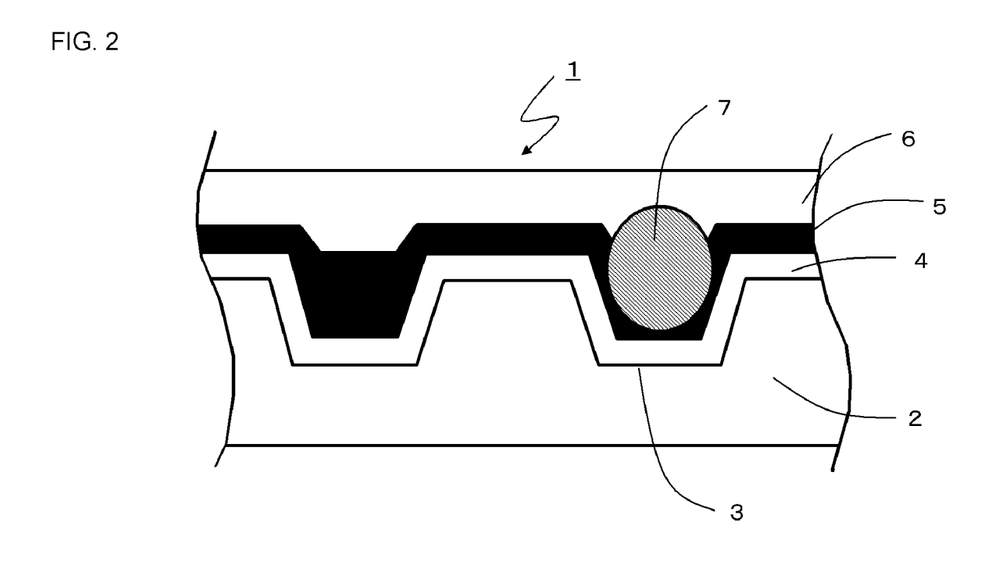
FIG. 2 is a schematic enlarged cross-sectional view of the optical information recording medium of the first embodiment according to an embodiment of the present invention, which shows the state after recording.

An optical information recording medium of a first embodiment according to an embodiment of the present invention will be described with reference to FIGS. 1 and 2. An optical information recording medium 1 shown in FIG. 1 has a disc-shaped substrate 2 having a penetrating hole (not shown) in a central portion thereof and a spiral pre-groove 3 provided in one surface of the substrate, a reflection layer 4 provided on the surface in which the pre-groove 3 is provided; a recording layer 5 which is provided on the reflection layer 4 and which is composed of an organic substance including a dye, and a light transmissive cover layer 6 provided on the recording layer 5.

The substrate 2 is a resin-made substrate having a thickness t of 1.1 mm, for example, and a diameter of 120 mm, for example. For this substrate 2, a material may be arbitrarily selected from various materials which are used for substrates of related optical information recording media. In particular, for example, there may be mentioned polycarbonate, an acrylic resin such as poly(methyl methacrylate), a vinyl chloride-based resin such as poly(vinyl chloride) or vinyl chloride copolymer, an epoxy resin, an amorphous polyolefin, a polyester resin, a metal such as aluminum, and glass, and whenever necessary, these materials mentioned above may be used in combination. Among the materials mentioned above, in consideration of moldability, moisture resistance, dimensional stability, and inexpensive price, and the like, a thermoplastic resin is preferable, and polycarbonate is particularly preferable. The substrate 2 as described above is formed by injection molding. In this molding, a stamper is fitted in a mold, and by the presence thereof, the spiral pre-groove 3 is formed in the substrate 2. This pre-groove 3 is a spiral groove 3 having a trapezoid cross-section formed from an inner to an outer circumferential side with pitches of 0.35 μm or 0.32 μm, for example, and pits are formed in this pre-groove 3.

The reflection layer 4 is formed of a thin film of a metal, such as a Ag alloy or an Al alloy, having a high reflectance by sputtering or the like over the entire region in which the spiral groove 3 is formed. The recording layer 5 is formed using a spin coating method, for example, by applying an organic substance containing a dye, such as a TFP (tetrafluoropropanol) solution containing an azo-based dye, a cyanine-based dye, or the like, over the entire surface on which the reflection layer 4 is formed.

The cover layer 6 is formed of a light transmissive resin to have a thickness of 0.1 mm, for example, by a spin coating method or the like using a curable resin to be cured by ultraviolet or radiation rays. The light transmission of this cover layer 6 having a cured thickness of 0.1 mm is, for example, 70% or more and preferably 80% or more when measured by a spectrophotometer using light having a wavelength of 405 nm. This cover layer 6 is formed from a curable resin having, for example, an elastic modulus of 40 MPa or less at 25° C. after curing which causes crosslinking of curable materials and can be performed by heat or UV irradiation (e.g., 300 mW/cm$^2$, 2 seconds). In this embodiment, the elastic modulus at 25° C. is measured by a nano-indentation method (Shiko Techno Engineering Reports, vol. 52, No. 2 (September 2002), pp. 74 to 77). Since the cover layer 6 formed from a curable resin having an elastic modulus of 40 MPa or less after curing is relatively soft and is liable to be scratched, a hard coat layer (not shown) composed of an acrylic resin or the like may be formed on the surface of the cover layer 6 at a light incident side. In addition, although the lower limit of the elastic modulus is not particularly limited, in order to prevent the cover layer 6 from being deformed by local pressure application, the elastic modulus is preferably 10 MPa or more. The cover layer can be formed from any suitable conventional material by utilizing any suitable conventional forming method, although a curable resin (such as a UV curable acrylic resin) is preferable. No particular restrictions should be imposed on the type of material or the method for forming as long as a cover layer formed from the material can posses an elastic modulus of 40 MPa or less. The skilled artisan in the art can readily prepare a cover layer having an elastic modulus of 40 MPa or less as a matter of routine experimentation.

Subsequently, the function of the optical information recording medium of the first embodiment according to the present invention will be described with reference to FIG. 2. When the optical information recording medium 1 is irradiated with recording laser light (not shown), the dye of the recording layer 5 in the pre-groove 3 is decomposed, and hence a pit 7 is formed. In this step, heat is generated in the recording layer 5 so as to deform the substrate 2 and the cover layer 6. The substrate 2 is formed of a material which is relatively not likely to be thermal-deformed in order to ensure superior tracking properties. Hence, the cover layer 6 having a low elastic modulus is more deformed than the substrate 2. As a result, the pit 7 has a shape intruding into the cover layer 6.

Since the elastic modulus of the cover layer 6 is relatively low, the shape of the pit 7 intruding into the cover layer 6 is maintained even after cooling. Since the cover layer 6 is designed to be easily thermal-deformed as described above, the amount of heat accumulated in the recording layer 5 is decreased, and hence the jitter property is improved. In addition, since the pit 7 intrudes into the cover layer 6, the change in light path length is increased, and since a space having a refractive index of approximately 1 is increased, a decrease in refractive index after recording is more significant, that is, an apparent refractive index change is improved, thereby obtaining a superior degree of modulation.

In this embodiment, it is not necessary that the entire cover layer 6 have an elastic modulus of 40 MPa or less, and only the interface region facing the recording layer may have an elastic modulus of 40 MPa or less. The region of the cover layer 6 at the interface side facing the recording layer 5 is, for example, a region having a thickness of 19 to 30 μm from the interface between the recording layer 5 and the cover layer 6. However, since the pit 7 is formed in the pre-groove 3, the thickness of the cover layer 6 at a place at which this pre-groove 3 is present is important. Hence, in this embodiment, the thickness of the region at the interface side is the thickness in the region at an interface side located over the pre-groove 3.

Figure 3:
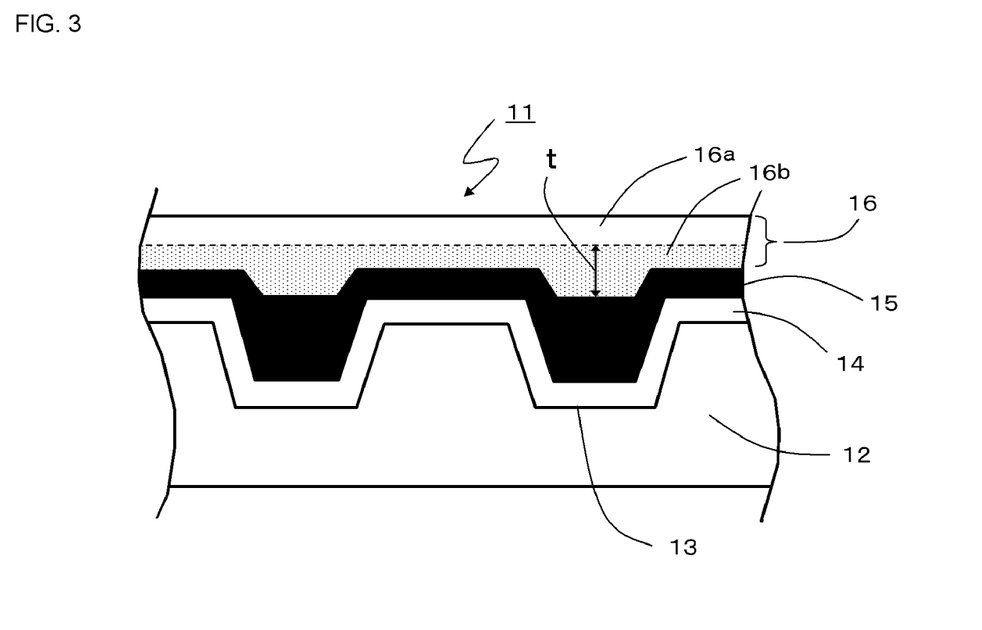
FIG. 3 is a schematic enlarged cross-sectional view of an optical information recording medium of a second embodiment according to an embodiment of the present invention.
Figure 4:
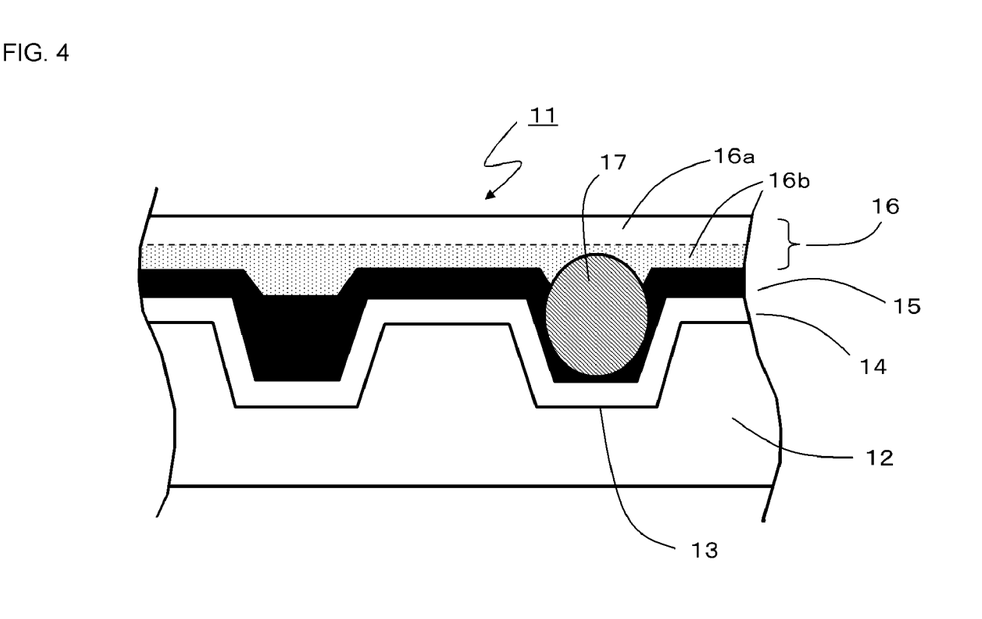
FIG. 4 is a schematic enlarged cross-sectional view of the optical information recording medium of the second embodiment according to an embodiment of the present invention, which shows the state after recording.

Next, an optical information recording medium of a second embodiment according to the present invention will be described with reference to FIGS. 3 and 4. The difference of an optical information recording medium 11 shown in FIG. 3 from the optical information recording medium 1 of the first embodiment is as follows. That is, a cover layer 16 has a two-layered structure formed of a first resin layer 16a having a relatively high elastic modulus and a second resin layer 16b having a relatively low elastic modulation, and the second resin layer 16b forms an interface region facing a recording layer 15.

The above cover layer 16 can be formed as described below. After a reflection layer 14 and the recording layer 15 are sequentially formed on the surface of a substrate 12 in which a pre-groove 13 is formed, a curable resin to be formed into the second resin layer 16b is applied by spin coating, for example. After the second resin layer 16b is cured, a curable resin to be formed into the first resin layer 16a is applied by spin coating, for example, and curing is then performed. As a result, the first resin layer 16a and the second resin layer 16b thus obtained collectively form the cover layer 16 having a thickness of 0.1 mm, for example.

Since the second resin layer 16b forms the interface side region facing the recording layer 15, the thickness of the second resin layer 16b over the pre-groove 13 is preferably 19 to 30 μm. When the thickness of the second resin layer 16b is in the range described above, the amount of deformation can be ensured that is capable of obtaining a superior jitter property and a superior degree of modulation.

Subsequently, the function of the optical information recording medium 11 according to the second embodiment of the present invention will be described with reference to FIG. 4. When the optical information recording medium 11 is irradiated with recording laser light (not shown), a dye of the recording layer 15 in the pre-groove 13 is decomposed, and hence a pit 17 is formed. In this step, heat is generated in the recording layer 15, and the second resin layer 16b is thermal-deformed. As a result, the pit 17 has a shape intruding into the cover layer 16.

Since the elastic modulus of the second resin layer 16b is relatively low, such as 40 MPa or less, at 25° C., the shape of the pit 17 intruding into the second resin layer 16b is maintained even after cooling. Accordingly, the amount of heat accumulated in the recording layer 15 is decreased, and hence the jitter property is improved. In addition, since the pit 7 intrudes into the second resin layer 16b, the change in light path length is increased, and since a space having a refractive index of approximately 1 is increased, a decrease in refractive index after recording is more significant, that is, an apparent refractive index change is improved, thereby obtaining a superior degree of modulation.

Figure 5:
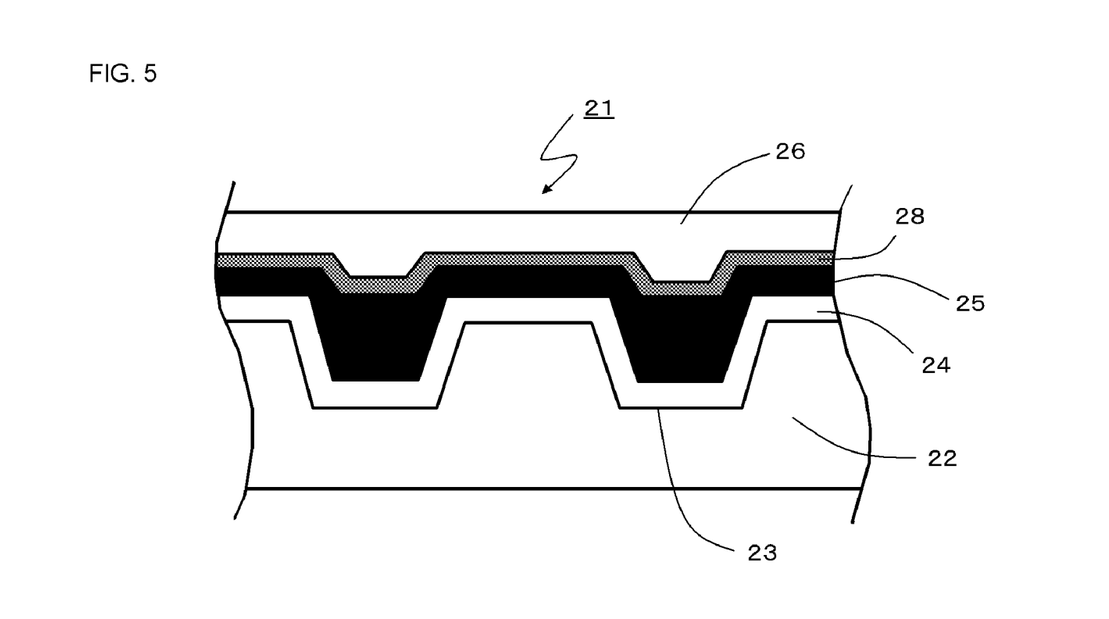
FIG. 5 is a schematic enlarged cross-sectional view of an optical information recording medium of a third embodiment according to an embodiment of the present invention.
Figure 6:
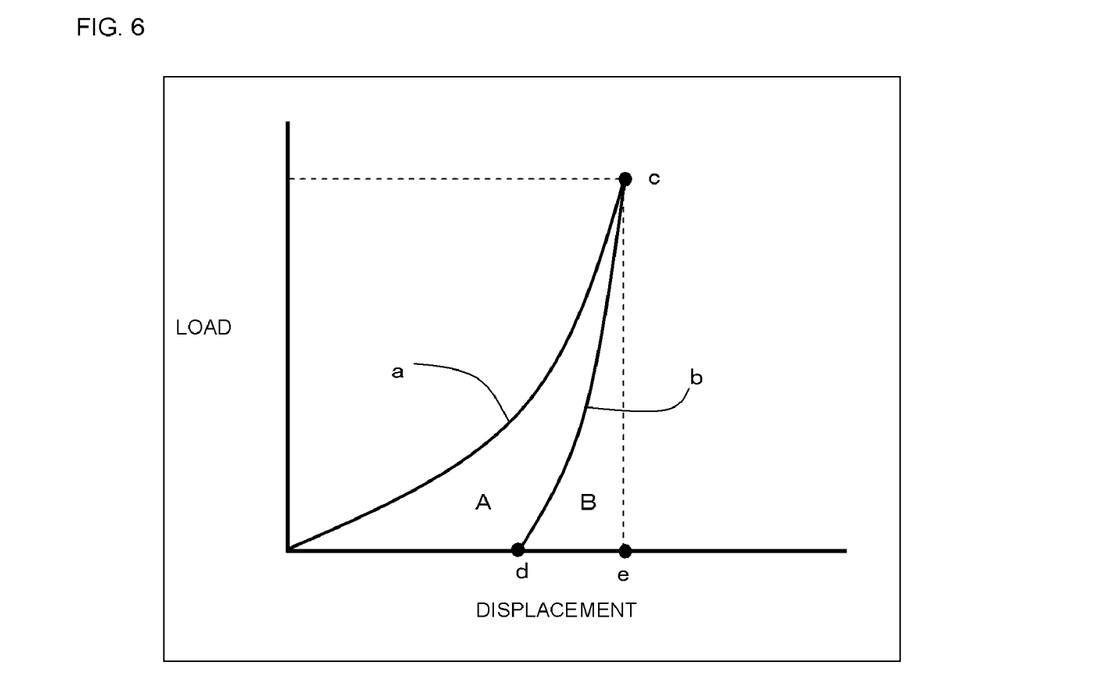
FIG. 6 is a graph showing a loading curve and an unloading curve in accordance with a nano-indentation method.
Figure 7:
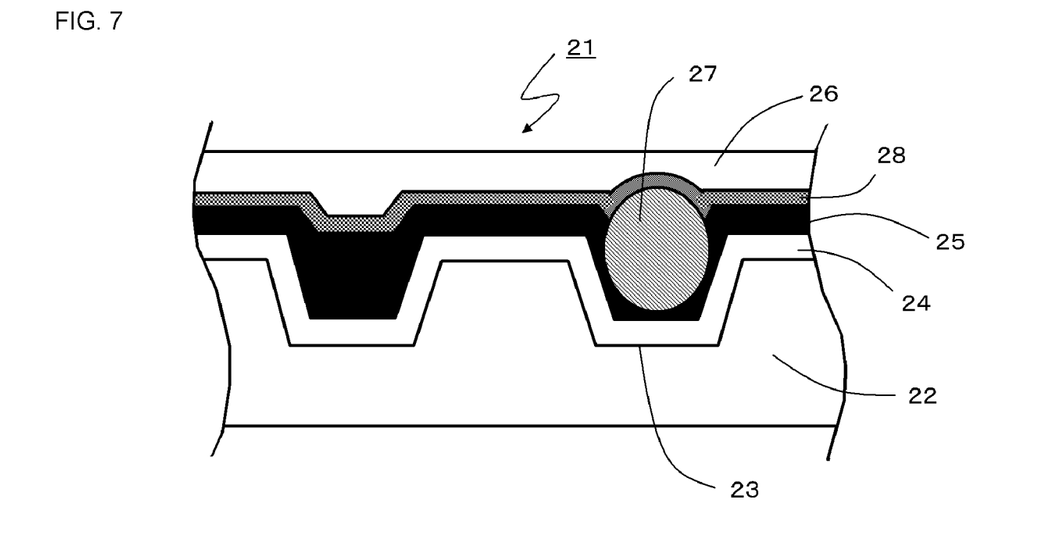
FIG. 7 is a schematic enlarged cross-sectional view of the optical information recording medium of the third embodiment according to an embodiment of the present invention, which shows the state after recording.

Next, an optical information recording medium of a third embodiment according to the present invention will be described with reference to FIGS. 5 to 7. The difference of an optical information recording medium 21 shown in FIG. 5 from the optical information recording medium 1 of the first embodiment is a protective layer 28 which is formed of a light transmissive inorganic substance and which is provided between a recording layer 25 and a cover layer 26.

This protective layer 28 prevents a mixing phenomenon, for example, in which a dye containing in the recording layer 25 diffuses to the cover layer 26 during the formation thereof, and/or a solvent or the like of a curable resin forming the cover layer 26 permeates the recording layer 25. As a material forming the protective layer 28, for example, there may be mentioned an oxide including zinc oxide, cerium oxide, yttrium oxide, or silicon oxide, such as silicon dioxide; a sulfide including zinc sulfide or yttrium sulfide; a nitride such as silicon nitride; silicon carbide; a mixture of an oxide and sulfur; and an alloy mentioned below. This protective layer 28 is formed by a sputtering method or the like. The thickness of the protective layer may be in the range of 5 nm to 200 nm (preferably 10 nm to 100 nm).

In the optical information recording medium 21 having the above structure, the protective layer 28 is deformed together with the cover layer 26. In order to deform the protective layer 28 following the deformation of the cover layer 26, an elastic-plastic deformation ratio (which is defined by the equation below) of the protective layer 28 may be set to 40% or less. Accordingly, the change ($\Delta$C/N) in C/N can be decreased to 1 dB or less, and hence the influence on the jitter property can be decreased. In this embodiment, the elastic-plastic deformation ratio is defined by the following equation.

Elastic-plastic deformation ratio[%]=(Elastic-plastic deformation work)×100/(Elastic-plastic deformation work+Plastic deformation work)

Next, the definition of the elastic-plastic deformation ratio will be described in detail with reference to the graph shown in FIG. 6. In the nano-indentation method, when a test load is applied to a sample, a loading curve a reaches an intersection point c between the test load and a point e which indicates the displacement. Next, when the test load is removed, the displacement reaches a point d along an unloading curve b. In this measurement, the area of a region A surrounded by the loading curve a, the unloading curve b, and the displacement axis is defined as the plastic deformation work [N·m], and the area of a region B surrounded by the unloading curve b, the displacement axis, and the vertical line between the points c and e is defined as the elastic-plastic deformation work [N·m]. By the above equation, when the elastic-plastic deformation ratio decreases, the point d becomes close to the point e, and the area of the region B decreases; hence, as a result, the tendency of plastic deformation becomes more significant as compared to that of elastic deformation.

Subsequently, the function of the optical information recording medium 21 of the third embodiment according to the present invention will be described with reference to FIG. 7. When the optical information recording medium 21 is irradiated with recording laser light (not shown), the dye of the recording layer 25 in a pre-groove 23 is decomposed, and hence a pit 27 is formed. In this step, heat is generated, and the protective layer 28 is thermal-deformed together with the cover layer 26. As a result, the pit 27 has a shape intruding into the cover layer 26.

The pit 27 maintains its shape intruding into the cover layer 26 even after cooling since the cover layer 26 has a relatively low elastic modulus of 40 MPa or less at 25° C. In addition, since the protective layer 28 has an elastic-plastic deformation ratio of 40% or less and tends to be easily plastic-deformed, the protective layer 28 is deformed following the deformation of the cover layer 26. Since the cover layer 26 is designed to be easily thermal-deformed as described above, the amount of heat accumulated in the recording layer 25 is decreased, and as a result, the jitter property can be improved. Furthermore, since the protective layer 28 is designed to be easily deformed following the deformation of the cover layer 26, the change $\Delta$C/N can be decreased to 1 dB or less, and hence the influence to the jitter property can be decreased. In addition, since the pit 27 has a shape intruding into the cover layer 26, the change in light path length is increased, and since a space having a refractive index of approximately 1 is increased, a decrease in refractive index after recording is more significant, that is, an apparent refractive index change is improved, thereby obtaining a superior degree of modulation.

In this embodiment, the cover layer 26 formed from one resin layer was described by way of example; however, when the cover layer 26 is formed from two resin layers as the case of the second embodiment, the effect similar to that in the second embodiment can be obtained. Although the lower limit of the elastic-plastic deformation ratio is not particularly limited, in order to prevent the protective layer 28 from being deformed by local pressure application, the lower limit is preferably 10% or more.

In the present disclosure where conditions and/or structures are not specified, the skilled artisan in the art can readily provide such conditions and/or structures, in view of the present disclosure, as a matter of routine experimentation.

Subsequently, the effect of the optical information recording medium according to embodiments of the present invention will be described with reference to the following examples. In the examples, the numerical numbers applied in embodiments can be modified by a range of at least ±50% in other embodiments, and the ranges applied in embodiments may include or exclude the endpoints.

Example 1

A disc-shaped substrate made of polycarbonate having an outer diameter of 120 mm and a thickness of 1.1 mm was formed by injection molding to have a penetrating hole in a central portion and a pre-groove having a track pitch of 0.32 μm. On the surface in which the pre-groove was formed, a reflection layer having a thickness of 100 nm was formed by sputtering using a Ag alloy. Subsequently, a dye solution containing a TFP solvent and an azo-based dye shown formula (1) was applied by a spin coating method, followed by drying at 80° C. for 30 minutes, thereby forming a recording layer. By the steps as described above, a plurality of samples necessary for evaluation was prepared.

(1)

wherein in the figure, A and A' each indicate a heterocyclic ring containing at least one hetero atom selected from the group consisting of a nitrogen, an oxygen, a sulfur, a selenium, and a tellurium atom, and may be the same or may be different from each other; $R_{21}$ to $R_{24}$ each independently indicate a hydrogen atom or a substituent; and $Y_{21}$ and $Y_{22}$ each indicate a hetero atom selected from atoms of Group XVI of the Periodic Table and may be the same or may be different from each other.

Next, UV curable resins (acrylic resins) having different elastic moduli at 25° C. after curing were applied on the individual samples thus prepared by a spin coating method, followed by curing, thereby forming a second resin layer having a thickness of 25 μm. Next, a UV curable resin having an elastic modulus of 1,700 MPa at 25° C. after curing was applied on the above samples by a spin coating method and was then cured to form a first resin layer, so that a cover layer having a thickness of 0.1 mm was formed collectively from the first and the second resin layers.

Figure 8:
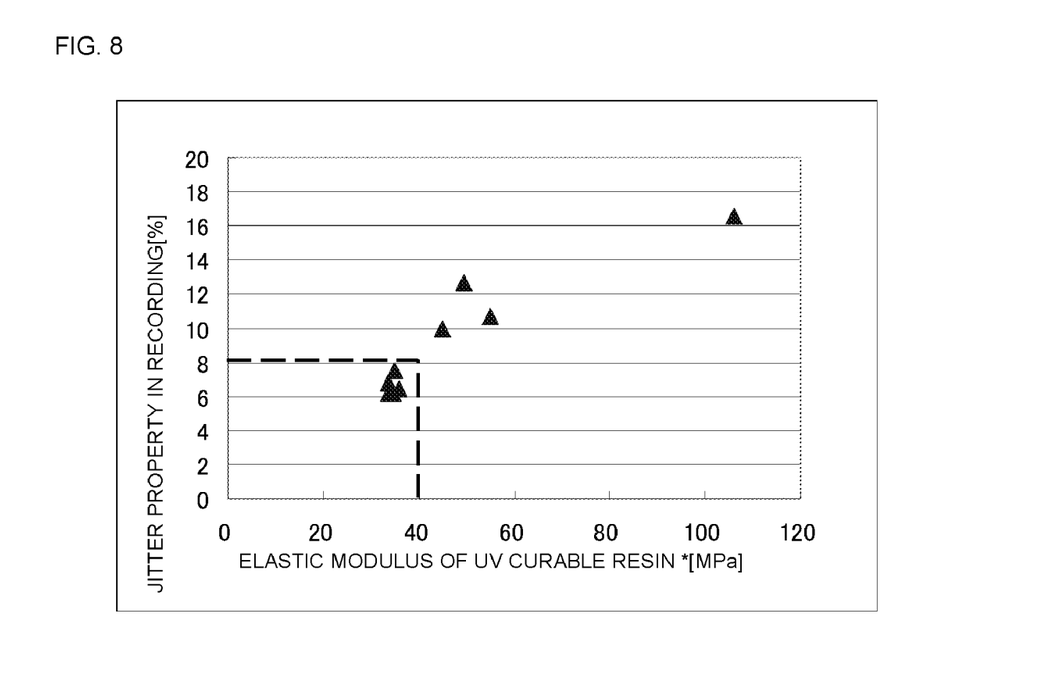
FIG. 8 is a graph showing the relationship between a jitter property and an elastic modulus of a cover layer.

Recording/Reproducing properties of the optical information recording media thus obtained as the samples were evaluated at a wavelength of 405 nm, a NA (numerical aperture) of 0.85, and a linear velocity of 4.92 m/s using a commercial available recording and reproducing apparatus (such as ODU-1000 manufactured by Pulstec Industrial Co., Ltd.), and the jitter property in recording and the degree of modulation were obtained. Subsequently, after the cover layer was peeled away from the substrate, and the dye was washed out, the elastic modulus of the second resin layer was obtained at a test load of 0.1 mN in accordance with a nano-indentation method. A jitter property in recording of 8.0% or less and a degree of modulation of 45% or more were set as the acceptance criteria. The results are shown in Table 1 and FIG. 8.

By using the optical information recording media thus obtained as the samples, 6T continuous recording (1T length: 0.08 μm) was performed at a linear velocity of 4.92 m/s, a reproducing power of 0.35 mW, a recording power of 5.5 mW, and a reproducing power (bias power) in recording of 1.2 mW by using a commercial available recording and reproducing apparatus (such as ODU-1000 manufactured by Pulstec Industrial Co., Ltd.), and by using a spectral analyzer (TA520, manufactured by YOKOGAWA), C/N immediately after recording was measured. Subsequently, after the reproducing power was increased to 0.55 mW, the same track was reproduced for one minute, and after the reproducing power was returned to 0.35 mW one minute later, C/N was again measured by the spectral analyzer. From the difference between the initial C/N and the C/N obtained after the reproduction was performed at 0.55 mW for one minute, the change ΔC/N was obtained.

After the change ΔC/N was measured, the cover layer was peeled away from the substrate, and the dye was washed out, so that the protective layer was obtained. Subsequently, the

TABLE 1

| | Sample No. | | | | | | | | |
|---|---|---|---|---|---|---|---|---|---|
| | 1 | 2 | 3 | 4 | 5 | 6 | 7 | 8 | 9 |
| Elastic Modulus (MPa) | 35 | 34 | 34 | 35 | 36 | 45 | 49 | 55 | 106 |
| Jitter Property in Recording (%) | 7.51 | 6.82 | 6.19 | 6.19 | 6.43 | 9.91 | 12.7 | 10.7 | 16.6 |
| Degree of Modulation (%) | 46 | 48 | 47 | 50 | 50 | 44 | 38 | 39 | 30 |

According to the above results, a jitter property in recording of 8.0% or less and a degree of modulation of 45% or more were obtained when the elastic modulus was 40 MPa or less, and hence superior results could be obtained.

Example 2

A disc-shaped substrate made of polycarbonate having an outer diameter of 120 mm and a thickness of 1.1 mm was formed by injection molding to have a penetrating hole in a central portion and a pre-groove having a track pitch of 0.32 μm. On the surface in which the pre-groove was formed, a reflection layer having a thickness of 100 nm was formed by sputtering using a Ag alloy. Subsequently, a dye solution containing a TFP solvent and an azo-based dye shown in formula (1) (the same as in Example 1) was applied by a spin coating method, followed by drying at 80° C. for 30 minutes, thereby forming a recording layer. By the steps as described above, a plurality of samples necessary for evaluation was prepared.

Next, protective layers having a thickness of 0.5 μm were formed on the above samples by sputtering using light transmissive protective layer materials having different elastic-plastic deformation ratios. The sputtering was performed by S-100W, manufactured by Shibaura Mechatronics Corporation. Next, a UV curable resin (acrylic resin) having an elastic modulus of 35 MPa at 25° C. after curing was applied on the individual samples by a spin coating method, followed by curing, thereby forming a second resin layer having a thickness of 25 μm. Subsequently, a UV curable resin having an elastic modulus of 1,700 MPa at 25° C. after curing was applied on the samples by a spin coating method and was then cured to form a first resin layer, so that a cover layer having a thickness of 0.1 mm was formed collectively from the first and the second resin layers.

elastic-plastic deformation work and the plastic deformation work were obtained at a test load of 0.1 mN by a nano-indentation method, and the elastic-plastic deformation ratio was then calculated. The results are shown in Table 2.

TABLE 2

| | Sample No. | | | |
|---|---|---|---|---|
| | 10 | 11 | 12 | 13 |
| Elastic-plastic deformation work (N · m) | $3.64 \times 10^{-13}$ | $4.61 \times 10^{-13}$ | $3.54 \times 10^{-13}$ | $2.40 \times 10^{-13}$ |
| Plastic deformation work (N · m) | $1.57 \times 10^{-13}$ | $2.63 \times 10^{-13}$ | $5.31 \times 10^{-13}$ | $5.73 \times 10^{-13}$ |
| Elastic-plastic deformation ratio (%) | 69.87 | 63.67 | 40.00 | 29.52 |
| ΔC/N (dB) | 20.29 | 20.01 | 0.66 | 0.105 |

According to the above results, the change ΔC/N can be decreased to 1 dB or less at an elastic-plastic deformation ratio of 40% or less, and hence a protective layer having no influence on the jitter property could be obtained.

The present application claims priority to Japanese Patent Application No. 2006-308603, filed Nov. 15, 2006, the disclosure of which is incorporated herein by reference in its entirety.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. An optical information recording medium comprising:
a substrate having a penetrating hole in a central portion thereof and a spiral pre-groove provided in one surface of the substrate;
a reflection layer provided on the surface of the substrate in which the pre-groove is provided;
a recording layer which is provided on the reflection layer and which is composed of an organic substance including a dye; and
a light transmissive cover layer provided on the recording layer,
wherein the cover layer has an elastic modulus of 10 MPa to 40 MPa at 25° C. in an interface region which is formed on a side facing the recording layer, said cover layer undergoing plastic deformation when pits are formed in the recording layer for recording.

2. The optical information recording medium according to claim 1, wherein the cover layer includes a first resin layer and a second resin layer having an elastic modulus lower than that of the first resin layer, and the interface region is composed of the second resin region.

3. The optical information recording medium according to claim 1, wherein the interface region on the pre-groove of the substrate has a thickness of 19 to 30 μm.

4. The optical information recording medium according to claim 1, further comprising a protective layer between the recording layer and cover layer, wherein an elastic-plastic deformation ratio of the protective layer is 40% or less.

5. The optical information recording medium according to claim 2, wherein the interface region on the pre-groove of the substrate has a thickness of 19 to 30 μm.

6. The optical information recording medium according to claim 2, further comprising a protective layer between the recording layer and cover layer, wherein an elastic-plastic deformation ratio of the protective layer is 40% or less.

7. The optical information recording medium according to claim 1, wherein the recording layer is configured to form pits by laser irradiation, deforming the cover layer more than the substrate.

8. The optical information recording medium according to claim 2, wherein the first and second resin layers are formed separately and consecutively.

9. The optical information recording medium according to claim 4, wherein the protective layer blocks diffusion of the dye in the recording layer into the cover layer.

10. The optical information recording medium according to claim 1, which has a jitter property in recording of 8.0% or less and a degree of modulation of 45% or more.

11. The optical information recording medium according to claim 4, which has a $\Delta C/N$ decreased to 1 dB or less.

* * * * *